Patented May 10, 1932

1,857,695

UNITED STATES PATENT OFFICE

GOTTHARD ROSÉN, OF PARIS, FRANCE, ASSIGNOR TO LA CELLULOSE ROSEN, SOCIETE ANONYME, OF LUXEMBURG, LUXEMBURG, A COMPANY OF LUXEMBURG

PROCESS FOR PREPARING RESINOUS WOOD FOR DIGESTION BY THE BISULPHITE PROCESS

No Drawing. Application filed May 16, 1931, Serial No. 538,007, and in France August 7, 1930.

Attempts have been made to convert resinous wood, such as pine (Pinus maritima, Pinus silvestris), into pulp, by treatment by the bisulphite process, which has hitherto been used mainly for the treatment of spruce or wood less resinous than pine. These attempts have not led to commercially satisfactory results owing to the presence of resinuous acids, which are concentrated mainly in the core of the trunk.

It has been attempted to remove these resinous matters from the wood before digestion by the bisulphite process, but this expedient has hitherto involved the disadvantage of considerably increased cost of production or has introduced complications which render the process commercially unsuccessful, even when the recovery by by-products is taken into account.

The present invention relates to a preliminary treatment of the resinous wood, whereby those disadvantages are avoided and the wood, when subsequently treated by the bisulphite process, yields a purer and whiter pulp containing a very high percentage of alpha-cellulose; it thus offers important advantages, particularly when the pulp is intended for the manufacture of high grade paper or of artificial silk.

According to the invention chips of resinous wood, such as Pinus maritima, Pinus silvestris, etc. are treated with milk of lime, preferably of a low concentration at a temperature not higher than 110° C.

The treatment may be conducted in a container of any suitable construction in which the milk of lime may be circulated continuously in a closed cycle. The operation is preferably continued for about 3 hours. The quantity of milk of lime may, for instance, be calculated on the basis of 1-2 per cent by weight of CaO for 99-98 per cent of dry wood.

At the end of this operation the liquid is run off and the treatment may be if desired repeated once or twice, each treatment lasting preferably 2-3 hours.

The treatment with milk of lime neutralizes the acids contained in the wood (in particular with the formation of calcium resinate); a part of the acids is removed owing to the progressive dissolution by the milk of lime, and the remainder is in any case neutralized.

These operations are preferably conducted at atmospheric pressure, but if desired a moderate pressure may be applied, for instance an over-pressure of ½ to 1 kilo per sq. cm.; in this case the temperature may be increased correspondingly and may, for instance, attain 110° C.

After the liquor of the final treatment with milk of lime has been run off, the chips are washed by passing through the apparatus a current of ordinary or salt-water. The chips treated in this manner are now ready for digestion by any known bisulphite process.

It will be understood that modifications may be made in the preliminary treatments above described without departing from the invention.

In particular, the chips which are to be digested may be treated with milk of lime of lower concentration than that above referred to, as for instance, a solution of 0.5-2° Bé. The duration of the operation will vary according to whether or not the liquid is circulated. When the liquid is circulated, the duration may be at least 2 hours, and may occupy up to 5 hours when the liquid is not circulated.

Finally, after running off the liquid, it is of advantage to subject the chips to a washing operation with salt water (preferably a solution of sodium chloride of about 1 per cent strength) for 10-15 minutes, with or without circulation of the liquid, and at ordinary temperature, that is to say, without application of heat. The wash liquor is then run off and the shavings are then ready for digestion with bisulphite liquor according to the known processes.

The purpose of this treatment with salt water is not only to wash the chips, but also to produce on their surface a deposit of a small quantity of neutral salt, which facilitates the absorption of sulphur dioxide during the digestion, particularly in the case of chips from the core of the trunk.

What I claim is:—

1. A process for treating resinous wood cut into chips prior to its being digested by the bisulphite process, which comprises subjecting it to at least one treatment with milk of lime, removing said milk of lime, and washing the treated material with water.

2. A process for treating resinous wood cut into chips, prior to its being digested by the bisulphite process, which comprises subjecting it to at least one treatment with milk of lime, removing said milk of lime and washing the treated material with salt water.

3. A process for treating resinous wood cut into chips prior to its being digested by the bisulphite process, which comprises subjecting said chips to at least one treatment with milk of lime of no more than 2° Bé., removing said milk of lime, and washing the treated material.

4. A process for treating resinous wood cut into chips prior to its being digested by the bisulphite process, which comprises subjecting said chips to at least one treatment with milk of lime of 1.5 to 2° Bé. removing said milk of lime, and washing the treated material.

5. A process for treating resinous wood cut into chips prior to its being digested by the bisulphite process, which comprises subjecting said chips to repeated treatment with milk of lime, with removal of the milk of lime after each treatment, and subjecting the material remaining after the removal of the last milk of lime to a washing.

6. A process for treating resinous wood cut into chips prior to its being digested by the bisulphite process, which comprises subjecting the chips to at least one treatment with a quantity of milk of lime containing from 1 to 2 per cent by weight of CaO for 99 to 98 per cent of dry wood, said treatment being continued for about 3 hours, removing said milk of lime, and washing the treated material with water.

7. A process for treating resinous wood cut into chips prior to its being digested by the bisulphite process, which comprises subjecting the chips to at least one treatment with a quantity of milk of lime containing from 1 to 2 per cent by weight of CaO for 99 to 98 per cent of dry wood, said treatment being continued for about 3 hours, removing said milk of lime, and washing the treated material with salt water.

8. A process for treating resinous wood cut into chips prior to its being digested by the bisulphite process, subjecting the chips to repeated treatments with a quantity of milk of lime containing from 1 to 2 per cent by weight of CaO for 99 to 98 per cent of dry wood, each treatment being continued for about 3 hours and being followed by removal of the milk of lime, and washing the resulting product.

9. A process for treating resinous wood cut into chips prior to its being treated by the bisulphite process, subjecting the chips to at least one treatment with milk of lime of 0.5 to 2° Bé., at a temperature of 105 to 110° C., and removing said milk of lime.

10. A process for treating resinous wood according to claim 9 in which the milk of lime is circulated through the mass of chips and each treatment by said milk of lime lasts about two hours.

11. A process for treating resinous wood according to claim 9, in which the milk of lime is not circulated through the mass of chips and each treatment by said milk of lime is continued for about five hours.

12. A process for treating resinous wood according to claim 3, in which the washing is effected by means of a solution of NaCl, at ordinary temperature.

In testimony whereof I have signed this specification.

GOTTHARD ROSÉN.